United States Patent [19]

Petrzelka et al.

[11] Patent Number: 4,512,679
[45] Date of Patent: Apr. 23, 1985

[54] UNIVERSAL JOINT

[75] Inventors: Miloslav Petrzelka, Much-Kranüchel; Herbert Taureg, Hennef-Löbach, both of Fed. Rep. of Germany

[73] Assignee: Uni-Cardan Aktiengesellschaft, Siegburg, Fed. Rep. of Germany

[21] Appl. No.: 404,891

[22] Filed: Aug. 3, 1982

[30] Foreign Application Priority Data

Aug. 5, 1981 [DE] Fed. Rep. of Germany ....... 3131000

[51] Int. Cl.³ .............................................. F16D 3/00
[52] U.S. Cl. ..................... 403/57; 464/128; 464/132
[58] Field of Search .................. 403/57, 58, 162, 163, 403/150, 151, 152; 464/132, 131, 130, 129, 128

[56] References Cited

U.S. PATENT DOCUMENTS

| | | | |
|---|---|---|---|
| 1,795,264 | 3/1931 | Peters | 464/132 X |
| 3,145,547 | 8/1964 | Lyons | 464/131 |
| 3,803,873 | 4/1974 | Goller | 464/130 |
| 4,412,827 | 11/1983 | Petrezelka et al. | 464/132 X |

FOREIGN PATENT DOCUMENTS

| | | | |
|---|---|---|---|
| 1122781 | 8/1962 | Fed. Rep. of Germany. | |
| 2737557 | 2/1978 | Fed. Rep. of Germany. | |
| 1231736 | 10/1960 | France | 464/14 |
| 10823 | 2/1981 | Japan | 464/130 |
| 1580718 | 12/1980 | United Kingdom. | |
| 0540075 | 12/1976 | U.S.S.R. | 464/132 |
| 0606021 | 5/1978 | U.S.S.R. | 464/131 |

Primary Examiner—Richard J. Scanlan, Jr.
Attorney, Agent, or Firm—Toren, McGeady and Stanger

[57] ABSTRACT

In a universal joint wherein a pair of yokes of the joint are connected by a trunnion cross having journals which extend into bores of the respective yokes, and wherein a bearing bush and needle bearings are provided between the cross journal and the inner surface of the yoke bore, grooves which extend, relative to the joint center, from a point radially inwardly thereof to a point radially outwardly thereof are formed on at least a part of at least one of the inner surface of the yoke bore and the outer surface of the bearing bush.

5 Claims, 5 Drawing Figures

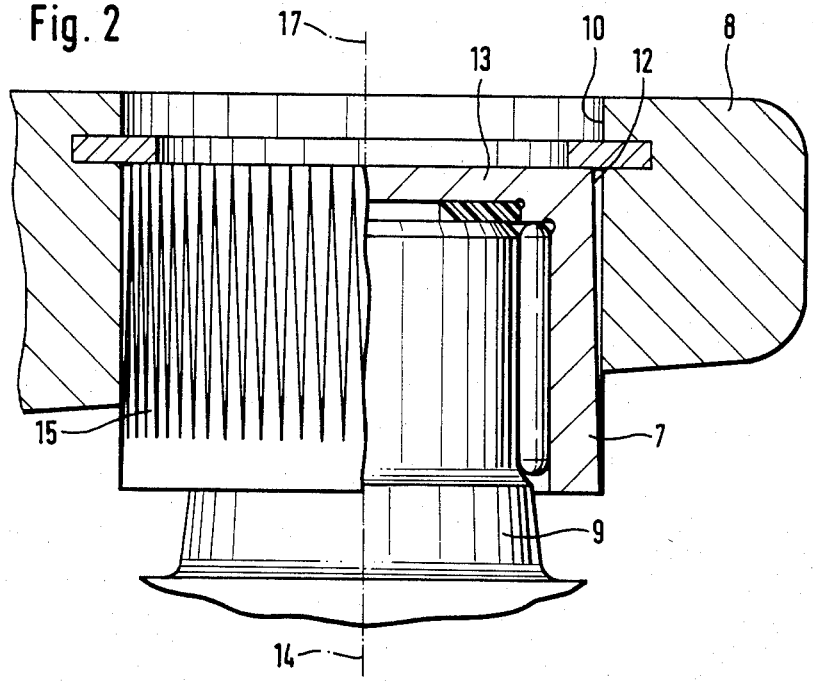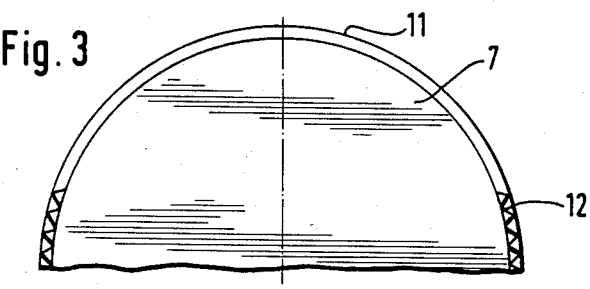

UNIVERSAL JOINT

The present invention relates generally to a universal joint, and more particularly to a joint wherein two joint yokes each having bores therein are connected together by a cross member having cylindrical bearing journals received within the bores with a bearing bush having a generally cylindrical inner face being received between the cross journals and the yoke bores.

Universal joints of the type to which the present invention relates are generally known wherein the bearing bushes are designed in such a manner that in the unloaded condition of a drive shaft connected with said joints, the bearing faces of the journals are not parallel to the faces of the bearing bushes. Thus, there is a tendency for uneven loading of the bearings supporting the journals of the cross member during torque transmission. The gap between the journal and the bearing bush may increase from the center of the joint outwardly thereof, and a disadvantage arises in that in the course of production a conical journal is very difficult to grind, and when a bush having conical faces is used, the undercut on the inside of the bush is also very difficult to produce. In a joint having needle rollers between the bearing bushes and the journals, the load may not be evenly distributed along their lengths.

It has been proposed in German Patent No. 1 122 781 that the bearing surfaces of the journals or bushes can be tapered so that under conditions of slight distortion during torque transmission, the needle rollers are evenly loaded. Although this approach involves some advantages, it nevertheless has the disadvantage that a conical surface is difficult to produce on the journals or bushes.

It has also been proposed in British Patent Specification No. 1 580 718 (corresponding to German Offenlegungsschrift 27 37 557) that the load acting on a journal bearing can be distributed to a number of bearing needles thereby improving the bearing properties of the universal joint and prolonging the service life. The bearing surfaces of the journals or bushes can be ground to a slightly elliptical profile so that the loading may be distributed among a greater number of needle rollers than would otherwise be the case. However, it will be seen that in this proposal, it is again difficult to manufacture the bearing surfaces to provide perfectly elliptical running faces.

The present invention is accordingly directed toward provision of a universal joint which will provide a more economical approach in utilizing the bearing capacity of the joint. The present invention is directed toward providing a joint such that without any special additional production or assembly operations, optimum utilization of the bearing capacity may be achieved and damage to the joint yoke or bearing bush during assembly may be avoided without incurring additional production costs.

SUMMARY OF THE INVENTION

Briefly, the present invention may be described as a universal joint having a joint center comprising yoke means having bore means therein adapted to receive the journal of a trunnion cross, said bore means having inner surface means, trunnion cross means including journal means received in said bore means of said yoke means, bearing means including bearing bush means having outer surface means operatively positioned within said bore means between said yoke means and said journal means, and groove means formed in at least a part of at least one of said inner surface means of said bore means and said outer surface means of said bearing bush means, said groove means, taken relative to said joint center, being arranged to extend from a point inwardly thereof to a point outwardly thereof.

In accordance with one aspect of the invention, the groove means may be provided on a part only of the circumference of either the inner surface means of the bore means or the outer surface means of the bearing bush means. Alternatively, the groove means may be provided about the entire circumference of said inner surface means or outer surface means.

The objectives of the invention are achieved in that at least part of the outer surface of the bearing bush or at least part of the inner face of the yoke bore in which the cross member is received, commencing from a point inwardly of the central axis of the universal joint and extending outwardly thereof, will be formed with conical or cylindrical grooves.

The advantage of such a design is that, by the provision of the grooves inside each yoke bore or on the exterior of each bearing bush, the potention for elastic deformation of the bearing bush is increased thereby optimizing torque loading or enabling a more even distribution of the loading of the bearings during any tendency to slight deformation during torque transmission. Additionally, the grooves facilitate installation of the bearing bushes in the yokes by acting in a manner analogous to a lead-in chamfer permitting easier and more accurate assembly without adversely affecting production costs. The grooves may be provided by knurling.

In accordance with a further aspect of the invention, if the grooves are formed on the outer surface of the bearing bush, the grooves may be arranged so that at their innermost ends, taken relative to the joint center, they will be a greater distance from the center axis of the bearing bush than at their outermost ends, taken relative to the joint center. The advantage of such a design is that under torque loading, the bearing bush is elastically deformed and adapted to the internal diameter of the bore whereby, over the entire length of the individual bearing needles, the needle bearings will be loaded more evenly. The result is optimum utilization of bearing capacity and prolonged service life under maximum load.

In accordance with a further feature of the invention, if the grooves are provided on the inner surface of the yoke bore, the grooves at their outermost end, taken relative to the joint center, will be a greater distance from the axis of the joint bore than at the innermost end of the groove, again taken relative to the joint center. In this arrangement, the torque load also results in elastic deformation of the bush with advantages similar to those described previously. In order to ensure that the elastic deformation is effective over the entire range of the articulation angle of the joint, the grooves in accordance with another feature of the invention may be provided to extend over an effective range of the circumference of the bearing bush or yoke bore which is at least as large as twice the maximum angle of articulation of the joint.

In order to enable assembly of the joint without special positioning of the bearing bush and to ensure that rotation of the bush during operation will not create any adverse effects, provision may be made for the grooves to extend across the entire circumference.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings

FIG. 2 is a sectional view, partially broken away, taken through the bearing assembly of one of the universal joints;

FIG. 3 is an end view of a part shown in FIG. 2;

DETAILED DESCRIPTION OF THE PREFERRED EMBODIMENTS

Figure 1:
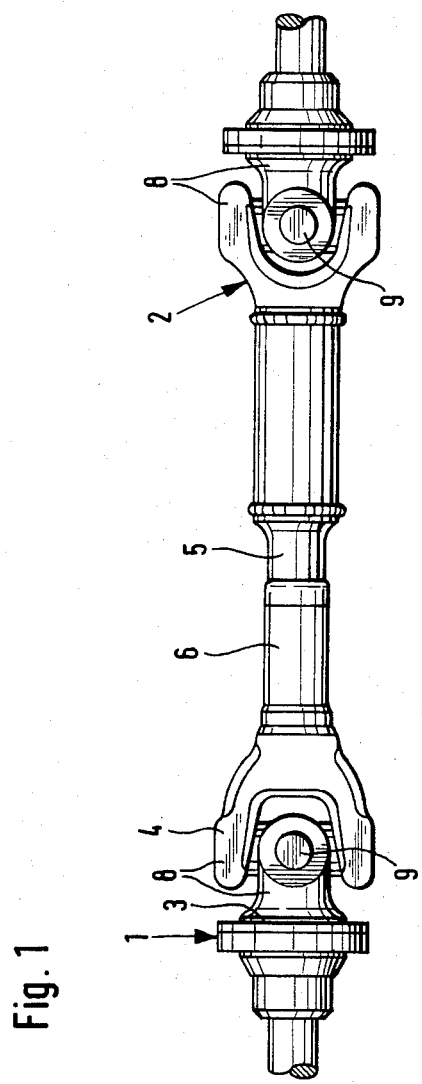
FIG. 1 is a plan view showing a drive shaft assembly with its ends provided with universal joints.

Referring now to FIG. 1, there is shown a shaft assembly comprising coaxial drive shaft portions 1 and 2 which are provided with universal joints 4 including yoke arms 8 interconnected by cross members 9, the universal joint 4 at the left end of the shaft assembly as viewed in FIG. 1 joining together a flange 3 with a shaft portion 6, and the universal joint at the right end of the shaft assembly shown in FIG. 1 interconnecting a shaft portion 5 with a flange 3. The shaft portion 6 formed at the inner end of the drive shaft portion 1 is formed as a hollow shaft, and the shaft portion 5 formed at the inner end of the drive shaft portion 2 is formed as a solid shaft. The solid shaft 5 and the hollow shaft 6 are connected with each other by splines so as to be nonrotative but axially movable relative to each other.

FIGS. 2 and 3 illustrate in greater detail the joinder of a journal portion of the cross member 9 within a bore 10 of the yoke 8. The bore 10 is formed with an inner surface within which there is received a bearing bush 7 as an individual component. Needle bearings are provided within the bearing bush 7 between the bearing bush 7 and the journal of the cross member 9. The bearing bush 7 comprises an outer surface or circumference 11 which is supported within the bore 10 of the joint yoke 8 with a press fit.

The outer surface 11 of the bearing bush 7 is provided with a conical face having formed therein grooves 12. The outer conical face of the bearing bush 7 is formed so that at the inner end thereof, taken relative to the center of the overall joint, it will be further away from a centerline 17 of the bearing bush 7 than at the outermost end thereof, again taken relative to the center of the overall joint. The bearing bush 7 is formed with a closed bearing bush bottom 13 and it will be seen that the outer face of the bearing bush 7 begins at the innermost end thereof, taken relative to the joint center, and extends toward the outermost end in the direction of the bearing bush bottom 13. The centerline 17 contains a plane 14, and the centerline 17 may be considered the centerline of both the bearing bush 7 and the journal of the cross member 9.

As shown in FIGS. 2 and 3, the grooves 12 extend across the circumference of the outer face 11 of the bearing bush 7 in a region 15 which extends through an angular distance which is greater than twice the angle of articulation of the joint.

Figure 4:
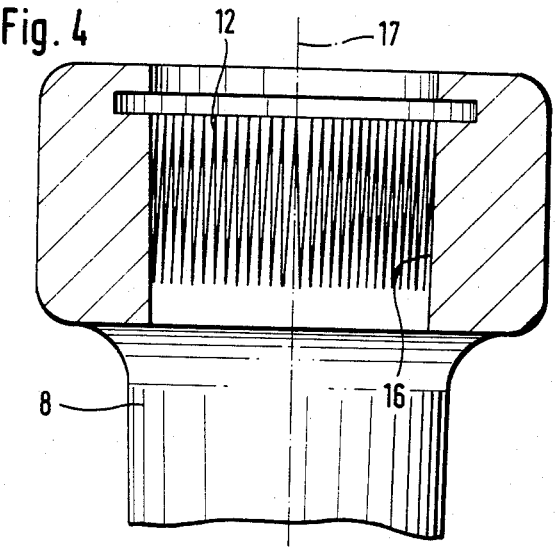
FIG. 4 is a sectional view through part of a yoke illustrating the invention.
Figure 5:
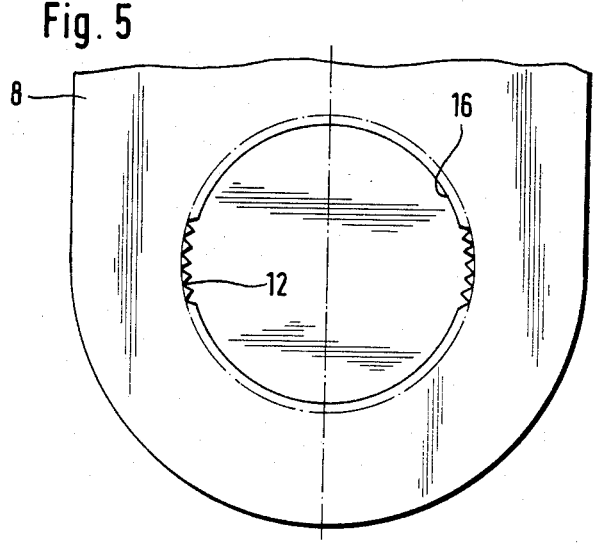
FIG. 5 is an end view of the yoke shown in FIG. 4.

FIGS. 4 and 5 show another embodiment of the invention wherein grooves 12 are formed on an inner surface 16 of the bore formed in the yoke member 8. The inner surface 16 in which the journal of the cross member is received is formed with grooves which extend along the inner surface 16 from an innermost point, taken relative to the joint center, to an outermost point. The grooves 12 extend across a circumferential area 15 which extends across an angular distance which is greater then twice the articulation angle of the joint. The conical grooves 12 extend in the yoke bore in the surface 16 from the innermost end to the outermost end at an increasing distance from the centerline 17. Thus, the innermost ends of the grooves 12 formed in the inner surface 16 of the yoke bore, taken relative to the center of the joint, will be closer to the centerline 17 of the yoke bore than the outermost ends of the grooves 12, taken relative to the joint center. This arrangement ensures that under torque loading, the bearing bush is elastically deformed whereby loading of the needle bearings will be uniform and evenly distributed thereby effecting optimum utilization of the bearing capacity of the joint.

It will be seen that in the various embodiments of the invention, the grooves may be formed to extend around the entire circumference of the outer surface of the bearing bush 7. This type of arrangement is shown in FIG. 2. Alternatively, the grooves may be formed to extend about only a part of the circumference, as is shown in FIG. 3. In a case where the grooves extend over only a part of the circumference of the bearing bush, the circumferential angular distance over which the grooves extend would be at least twice the maximum angle of articulation of the joint. The grooved area of the bearing bush would contain a plane 14 defined by the centerline 17 of the bore in the yoke when rotating in use.

Referring to FIG. 4 of the drawings, there is shown an embodiment wherein the inner surface 16 of the yoke arm 8 is provided with the grooves 12 over the entire circumference thereof. In FIG. 5, there is shown the embodiment wherein the grooves are provided only along a part of the circumference of the yoke bore. The circumferential extent of the grooves shown in FIG. 5 would be the same as is shown in FIG. 3 for the outer surface of the bearing bush 7.

The grooves of the present invention may be made of increasing depth as they extend outwardly so that their bases lie on a frustoconical surface.

Furthermore, the grooves may be of increasing depth with increasing distance from the axis of rotation of the yoke.

It will thus be seen that if the grooves 12 are arranged in the bearing bush 7, the grooves 12 at their innermost ends will be a greater distance from the center axis 17 of the bearing bush 7 than at their outermost ends.

If the grooves 12 are arranged in the bore surface 16 of the joint yoke 8, then the grooves 12 at their outermost ends will be a greater distance from the center axis 17 of the bore than at their innermost ends.

As indicated in the foregoing, the grooves 12 may extend over an effective range of the circumference of the bush 7 or the bore 16 which is at least as large as double the amount of the maximum articulation angle of the joint. The grooves may also extend over the entire circumferences of either the bush 7 or the surface 16 of the yoke bore.

While specific embodiments of the invention have been shown and described in detail to illustrate the application of the inventive principles, it will be understood that the invention may be embodied otherwise without departing from such principles.

What is claimed is:

1. A universal joint having a joint center comprising:
   yoke means having a bore therein adapted to receive the journal of a cross member, said bore having an inner surface;
   a cross member including a journal having a journal axis received in said bore of said yoke means;
   bearing means including a bearing bush having an outer surface operatively positioned within said bore between said yoke means and said journal engaged with a press fit between said outer surface and said inner surface; and
   grooves formed in at least a part of at least one of said inner surface of said bore and said outer surface of said bearing bush, said grooves extending generally parallel to said journal axis and having an increasing depth with increasing distance from said joint center.

2. A joint according to claim 1, wherein said grooves are formed on said outer surface of said bearing bush and wherein the portions of said outer surface which lie radially outermost from said journal axis and which are located between said grooves extend with a generally conical configuration.

3. A joint according to claim 1, wherein said grooves extend over an effective circumferential distance of said at least one said inner surface of said bore and said outer surface of said bearing bush which is at least as large as twice the maximum articulation angle of said joint.

4. A joint according to claim 1, wherein said grooves extend over the entire cirumference of said inner surface of said bore.

5. A joint according to claim 1, wherein said grooves extend across the entire circumference of said outer surface of said bearing bush.

* * * * *